(12) United States Patent
Mäenpää et al.

(10) Patent No.: US 8,086,291 B2
(45) Date of Patent: Dec. 27, 2011

(54) COVER TO A PORTABLE ELECTRONIC APPARATUS COMPOSED OF LEATHER AND/OR TEXTILE

(75) Inventors: Tarmo Mäenpää, Salo (FI); Liisa Mäkinen, Salo (FI); Matti Kauppi, Märynummi (FI); Marjukka Joutsen, Halikko (FI); Marjatta Eskelinen-Välimaa, Salo (FI); Jukka Salin, Inkere (FI); Sami Lindroos, Turku (FI); Taina Tervonen, Salo (FI); Marko Santaoja, Kaarina (FI); Jan Brandt, Turku (FI); Annika Laaksonen, Angelniemi (FI); Heikki Kasurinen, Inkere (FI)

(73) Assignee: Nokia Corporation, Espoo (FI)

( * ) Notice: Subject to any disclaimer, the term of this patent is extended or adjusted under 35 U.S.C. 154(b) by 1277 days.

(21) Appl. No.: 10/506,231

(22) PCT Filed: Mar. 4, 2003

(86) PCT No.: PCT/FI03/00157
§ 371 (c)(1),
(2), (4) Date: Aug. 30, 2004

(87) PCT Pub. No.: WO03/077510
PCT Pub. Date: Sep. 18, 2003

(65) Prior Publication Data
US 2005/0153757 A1    Jul. 14, 2005

(30) Foreign Application Priority Data
Mar. 8, 2002 (FI) .................................. 20020100 U

(51) Int. Cl.
*H04M 1/00* (2006.01)

(52) U.S. Cl. ............... 455/575.8; 455/575.1; 455/556.2; 264/328.1; 264/265; 264/279; 428/209; 428/457

(58) Field of Classification Search ............... 455/575.8, 455/575.1, 556.2; 379/433.11, 434, 433.1; 264/328.1, 265, 279; 428/209, 457
See application file for complete search history.

(56) References Cited

U.S. PATENT DOCUMENTS

| | | | | |
|---|---|---|---|---|
| 4,427,615 A | * | 1/1984 | Eskesen | 264/261 |
| 4,481,160 A | * | 11/1984 | Bree | 264/135 |
| 5,768,370 A | | 6/1998 | Maatta et al. | 379/433.01 |
| 5,923,752 A | | 7/1999 | McBride et al. | 379/433.11 |
| 6,330,430 B1 | * | 12/2001 | Jensfelt | 455/575.8 |
| 6,670,028 B2 | * | 12/2003 | Ellison et al. | 428/300.7 |
| 2002/0027768 A1 | * | 3/2002 | Tseng et al. | 361/683 |
| 2002/0076512 A1 | * | 6/2002 | Kreider | 428/34.1 |
| 2002/0078804 A1 | * | 6/2002 | Spengler | 83/13 |
| 2002/0170902 A1 | * | 11/2002 | Check et al. | 219/217 |
| 2002/0174994 A1 | * | 11/2002 | Wu | 174/35 R |
| 2002/0175099 A1 | * | 11/2002 | Wu | 206/320 |

FOREIGN PATENT DOCUMENTS

| | | |
|---|---|---|
| DE | 4343240 A1 | 6/1995 |
| DE | 20011372 U1 | 12/2000 |
| DE | 20008744 U1 | 4/2001 |
| DE | 20101039 U1 | 6/2001 |
| DE | 19960054 A1 | 7/2001 |
| EP | 1028574 A2 | 8/2000 |
| EP | 1161061 A1 | 12/2001 |
| EP | 1028574 A3 | 10/2002 |

* cited by examiner

*Primary Examiner* — Ajit Patel
*Assistant Examiner* — Khai M Nguyen
(74) *Attorney, Agent, or Firm* — Harrington & Smith

(57) ABSTRACT

The invention relates to a cover adapted to be removably attachable to a portable electronic apparatus. The cover has an outer face which is exposed when the cover is attached to the apparatus. Said outer face has entirely or partly a distinctive appearance composed of leather and/or textile as a surface of said outer face.

1 Claim, 1 Drawing Sheet

COVER TO A PORTABLE ELECTRONIC APPARATUS COMPOSED OF LEATHER AND/OR TEXTILE

FIELD OF THE INVENTION

The present invention relates to a cover for a portable electronic apparatus, such as portable telephone, according to the independent claim set forth below. In particular, the invention relates to a novel and inventive construction of the cover.

BACKGROUND OF THE INVENTION

Portable electronic apparatuses are generally well known in the prior art and include portable telephones, such as cellular radiotelephones, cordless radiotelephones and personal communicators. E.g. portable telephones have become widely accepted form of communication in the cordless telephone and cellular telephone markets.

Because of such wide acceptance, distinguishing appearance of the portable electronic apparatuses has become an important need for a customer, a manufacturer and a distributor of the portable electronic apparatus.

To change color or appearance of the portable electronic apparatus such as portable telephone, user has typically used cases for holding the portable telephone. These cases are typically soft, manufactured from leather, textile fabric or similar material, and include cutout portions corresponding to control buttons and other external features of the phone. However, these cases are clumsy, they disturb connection to the external equipment of the phone, add weight and have a limited affect on the appearance of the portable telephone.

In order to better correspond to the above mentioned need of the convertibility of appearance of the portable telephones, manufacturers of portable telephones and accessories have developed different kinds of outer covers designed to fit over existing portable telephones. This kind of cover has been disclosed e.g. in U.S. Pat. No. 5,923,752.

U.S. Pat. No. 5,768,370 discloses a portable telephone with a plurality of distinctive appearances. That is, the portable telephone comprises a changeable cover, changeable collars and a changeable window for creating new images of the phone. The above mentioned changeable elements can be in different colours.

However, using patterns created with different colors is not enough to satisfy the booming need to totally tailor the portable telephone of the user to the clothing or furnishing of the user.

Furthermore, the use of convenient portable telephones comprising covers, the outer face of which is plastic, is unattractive and uncomfortable for the user.

SUMMARY OF THE INVENTION

The object of the present invention is to achieve a cover for a portable electronic apparatus, such as a portable telephone, whereby the above described drawbacks of the prior art have been minimized.

The object of the present invention is especially to achieve a cover for a portable electronic apparatus, which comprises leather and/or textile as a surface of the cover in order to give distinctive appearance for the apparatus.

The above-described drawbacks can be eliminated or minimized, and the above-mentioned objects can be achieved by means of a cover according to the present invention, which is characterized by what is set forth below in the characterizing part of the independent claim.

A typical cover according to the invention is adapted to be removably attachable to a portable electronic apparatus, such as a portable telephone. Said apparatus comprises a housing containing electronic components and a cover having an outer face which is exposed when the cover is attached to the apparatus. Said outer face of the cover has entirely or partly a distinctive appearance composed of leather and/or textile as a surface of said outer face.

One of the most important advantage of the invention is that the cover enables manufacturers and a distributors of the portable electronic apparatus and/or covers used in the portable electronic apparatus to provide customers with covers that fit well to the clothing or the furnishing of the customers.

Another important advantage of the invention is that the cover comprising leather and/or textile as a surface of the cover is comfortable in use. Furthermore, said surface of the cover allows better friction in handling of the apparatus.

An advantageous cover according to the present invention is intended to be used in conjunction with a electronic apparatus in which apparatus electronic components include a plurality of operating buttons for the operation of the apparatus and a display for displaying information concerning operation of the apparatus, and the cover encloses said components at least partially within said housing, said outer face having a primary opening for viewing said display on said housing and a plurality of secondary openings for free reception therethrough of said operation buttons of said housing. Thus it can be adapted to be a replacement cover for replacing a detachable cover of a portable electronic apparatus and thereby to modify the external appearance of the apparatus.

Another important advantage of the invention is that the assembly of a portable electronic apparatus becomes more simple and economic due to the fact that the invention takes away one part from the apparatus and thus, there is no need for additional covers made of leather or textile.

An advantageous cover according to the present invention is formed as one fixed body, i.e. the leather and/or textile is non-detachable from the rest of the cover.

The leather and/or textile could also be arranged detachable from the rest of the cover but the solution with one fixed body enhances the advantages of the invention, e.g. the better usability.

A further advantageous cover according to the present invention comprises a top layer made of leather and/or textile and a bottom layer which is injection molded into said top layer which is intended to be placed against said housing. This ensures durability of the cover.

The bottom layer comprises advantageously means for removably attach said cover to said housing. These means enables easy and quick change of the cover in order to modify the distinctive appearance of the apparatus comprising said cover.

A further advantageous cover according to the present invention is non-planar. This ensures stable fastening of the cover.

Other and further features, advantages and benefits of the invention will become apparent in the following description taken in conjunction with the following drawings.

BRIEF DESCRIPTION OF THE DRAWINGS

The invention shall be described in more detail below with reference to the appended schematical drawings with reference to a portable telephone which serves as an example of a portable electronic apparatus, wherein.

DETAILED DESCRIPTION OF THE INVENTION

Figure 1:
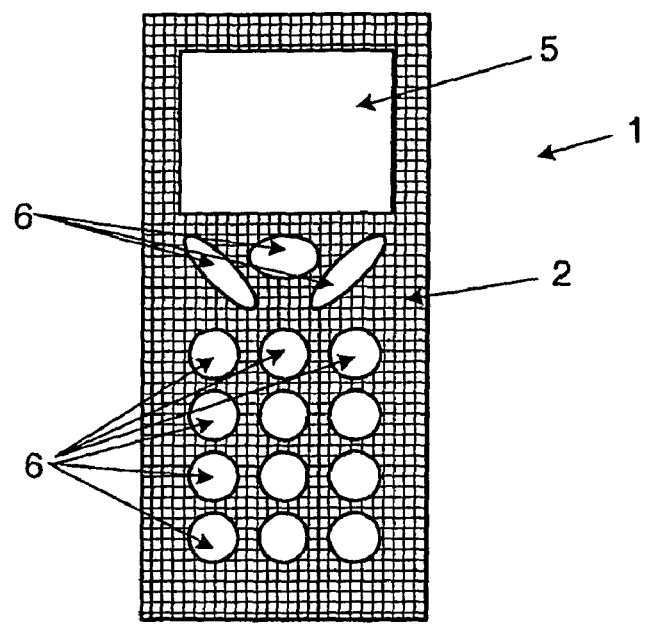
FIG. 1 is a View of a cover according to the invention.
Figure 2:
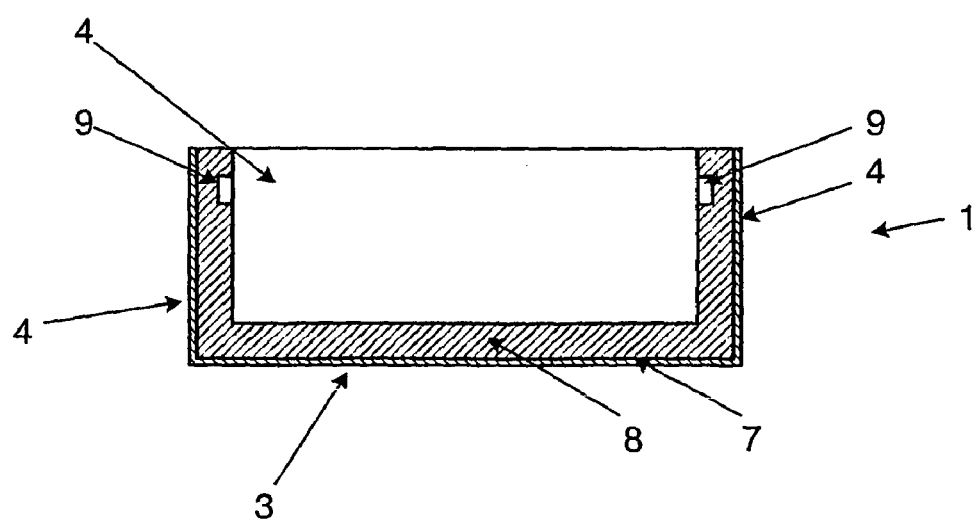
FIG. 2 is a cross-sectional view of a cover according to the invention.

In accordance with FIGS. 1 and 2, a typical removably attachable cover 1 for a portable telephone comprises an outer face 2 which is exposed when the cover is attached to a main housing of the telephone (not shown in figures).

The cover 1 is non-planar, designed as a thin-walled shell having a mainly planar middle section 3 and side walls 4 extending from said middle section. It is designed in such a way that it can receive the main housing at least partly in it. Dimensions of the cover vary according to dimensions of the telephone and the housing in which the cover is intended to be used.

The middle section 3 has a primary opening 5 for viewing an display of the telephone and a plurality of secondary openings 6 for free reception therethrough of operation buttons of the telephone. It is self-evident, that the amount of the openings can vary and if the cover is intended to be used as a replacement cover for replacing the rear cover of the telephone, it is possible that the cover has not any openings.

In the cross-sectional view of FIG. 2 it is schematically illustrated how the cover 1 is formed as one fixed body. The cover 1 comprises a top layer 7 made of textile fabric and a bottom layer 8 which is injection molded into said top layer during a process of manufacture of the cover. The bottom layer 8 is intended to be placed against the housing of the telephone during use of the cover whereupon the top layer 7 acts as a outer face of the cover. Instead of textile, the top layer 7 can be made of leather or of mixture of textile and leather. The material of the bottom layer 8 can be any suitable injection moldable material such as plastic or metal.

The bottom layer 8 in the side walls 4 comprises means 9 for removably attaching the cover against the housing with a snap-on connection. Said means 9 are illustrated schematically and their form, amount and positioning depend on design of the telephone and the housing in which the cover is intended to be used.

Examples of the designs of the cover and of attachments that can be used to removably attach the cover to the housing is disclosed for example in European patent application No. 1028574 and in European patent application No. 1161061.

The cover according to the invention can be manufactured by injection molding. In one enabling manufacturing process the top layer of the cover is made of a textile or leather which is laminated together with thin foil or which has a sprayed thin layer coating, and which is preformed to the shape of the cover. Form of the cover is cut from preformed sheet and the form is placed to a mold and the bottom layer material of the cover is injected to the mold. After finishing procedure the cover is completed.

For a man skilled in the art, it is obvious that the invention is not restricted to the above-described example only, but it may vary within scope of the claims set forth below. E.g. the cover according to the invention may comprise several parts which, when attached to a electronic apparatus, form a cover of the apparatus or a part of a cover of the apparatus.

The invention claimed is:

1. Method of manufacture of a cover adapted to be removably attachable to a portable electronic apparatus in which method
   a top layer of the cover is made of textile fabric, leather or of mixture of textile and leather, wherein the top layer of the cover is made of either
      a) a textile or leather laminated together with thin foil, or
      b) a textile or leather having a sprayed thin layer coating, and
   a bottom layer is injection molded into said top layer, wherein
      the top layer of the cover is preformed to the shape of the cover,
      the form of the cover is cut from said preformed sheet, said form is placed to a mold, and
      bottom layer material of the cover is injected to the mold.

* * * * *